United States Patent
Gilliland et al.

(10) Patent No.: US 9,682,311 B2
(45) Date of Patent: Jun. 20, 2017

(54) GAMING SYSTEM AND METHOD FOR PROVIDING A SKILL-BASED GAME

(71) Applicant: IGT, Reno, NV (US)

(72) Inventors: Sean M. Gilliland, Reno, NV (US); Thomas Billings, Reno, NV (US); Jeremy Bryan, Rancho Cucamonga, CA (US); Salvador A. Castellon, Reno, NV (US); Shavon Gardner, Reno, NV (US); Thomas J. Humphrey, Reno, NV (US); Christian Lopez, Reno, NV (US); James T. McGlone, Reno, NV (US); Maria J. Nepomuceno, Reno, NV (US); Kyu Shin, Reno, NV (US); Jun Yi, Beijing (CN)

(73) Assignee: IGT, Las Vegas, NV (US)

( * ) Notice: Subject to any disclaimer, the term of this patent is extended or adjusted under 35 U.S.C. 154(b) by 926 days.

(21) Appl. No.: 13/628,860

(22) Filed: Sep. 27, 2012

(65) Prior Publication Data

US 2014/0087844 A1    Mar. 27, 2014

(51) Int. Cl.
A63F 9/24 (2006.01)
A63F 13/00 (2014.01)
G07F 17/32 (2006.01)

(52) U.S. Cl.
CPC .......... *A63F 13/00* (2013.01); *G07F 17/3244* (2013.01); *G07F 17/3255* (2013.01); *G07F 17/3267* (2013.01); *G07F 17/32* (2013.01); *G07F 17/326* (2013.01); *G07F 17/3262* (2013.01); *G07F 17/3269* (2013.01); *G07F 17/3295* (2013.01)

(58) Field of Classification Search
CPC ........ G07F 17/34; G07F 17/32; G07F 17/326; G07F 17/3262; G07F 17/3269
USPC .......................................... 463/1, 16, 20, 25
See application file for complete search history.

(56) References Cited

U.S. PATENT DOCUMENTS

| | | | |
|---|---|---|---|
| 6,050,895 A | 4/2000 | Luciano, Jr. et al. | |
| 6,267,669 B1 | 7/2001 | Luciano, Jr. et al. | |
| 6,572,473 B1 | 6/2003 | Baerlocher | |
| 6,746,016 B2 | 6/2004 | Perrie et al. | |
| 6,752,717 B2 | 6/2004 | Vancura | |
| 6,761,632 B2 | 7/2004 | Bansemer et al. | |
| 6,780,103 B2 | 8/2004 | Bansemer et al. | |

(Continued)

*Primary Examiner* — David L Lewis
*Assistant Examiner* — Chase Leichliter
(74) *Attorney, Agent, or Firm* — Neal, Gerber & Eisenberg LLP

(57) ABSTRACT

In various embodiments, the gaming system and method disclosed herein provides a primary game in which the gaming system provides monetary awards to a player and a secondary game in which the gaming system provides non-monetary skill units to the player. In one such embodiment, the gaming system initiates the play of the skill-based secondary game in response to a triggering even associated with a primary game of the gaming system, and forms a score for the player based on zero, one or more inputs made by the player during the play of the skill-based secondary game. The gaming system determines an amount of non-monetary skill units to provide the player based on the score, and provides the player with the non-monetary skill units. The player redeems any amount of non-monetary skill units for one or more virtual goods offered via a virtual marketplace.

21 Claims, 14 Drawing Sheets

(56) References Cited

U.S. PATENT DOCUMENTS

| | | |
|---|---|---|
| 6,852,027 B2 | 2/2005 | Kaminkow et al. |
| 6,863,606 B1 | 3/2005 | Berg et al. |
| 6,942,568 B2 | 9/2005 | Baerlocher |
| 6,984,174 B2 | 1/2006 | Cannon et al. |
| 6,988,732 B2 | 1/2006 | Vancura |
| 7,073,793 B2 | 7/2006 | Vancura |
| 7,077,744 B2 | 7/2006 | Cannon |
| 7,175,521 B2 | 2/2007 | McClintic |
| 7,217,187 B2 | 5/2007 | Vancura |
| 7,326,115 B2 | 2/2008 | Baerlocher |
| 7,572,182 B2 | 8/2009 | Vancura |
| 7,682,239 B2 | 3/2010 | Friedman et al. |
| 7,967,674 B2 | 6/2011 | Baerlocher |
| 8,033,912 B2 | 10/2011 | Cannon |
| 8,075,383 B2 | 12/2011 | Friedman et al. |
| 8,113,938 B2 | 2/2012 | Friedman et al. |
| 8,231,453 B2 | 7/2012 | Wolf et al. |
| 8,267,765 B2 | 9/2012 | Baerlocher |
| 8,393,957 B2 | 3/2013 | Walker et al. |
| 8,398,475 B2 | 3/2013 | De Waal et al. |
| 8,435,111 B2 | 5/2013 | Filipour et al. |
| 2002/0160825 A1* | 10/2002 | Nicastro ............ G07F 17/32 463/16 |
| 2004/0106446 A1 | 6/2004 | Cannon et al. |
| 2008/0311980 A1 | 12/2008 | Cannon |
| 2010/0234089 A1 | 9/2010 | Saffari et al. |
| 2010/0234091 A1 | 9/2010 | Baerlocher et al. |
| 2011/0053676 A1 | 3/2011 | Wolf et al. |
| 2011/0118011 A1 | 5/2011 | Filipour et al. |
| 2011/0212764 A1 | 9/2011 | Baerlocher et al. |
| 2011/0244951 A1* | 10/2011 | Shaw ............ G07F 17/32 463/26 |
| 2012/0115581 A1* | 5/2012 | Englman ........... G07F 17/34 463/25 |
| 2012/0122553 A1* | 5/2012 | Bunch et al. ............... 463/23 |
| 2013/0005424 A1 | 1/2013 | Baerlocher |

* cited by examiner

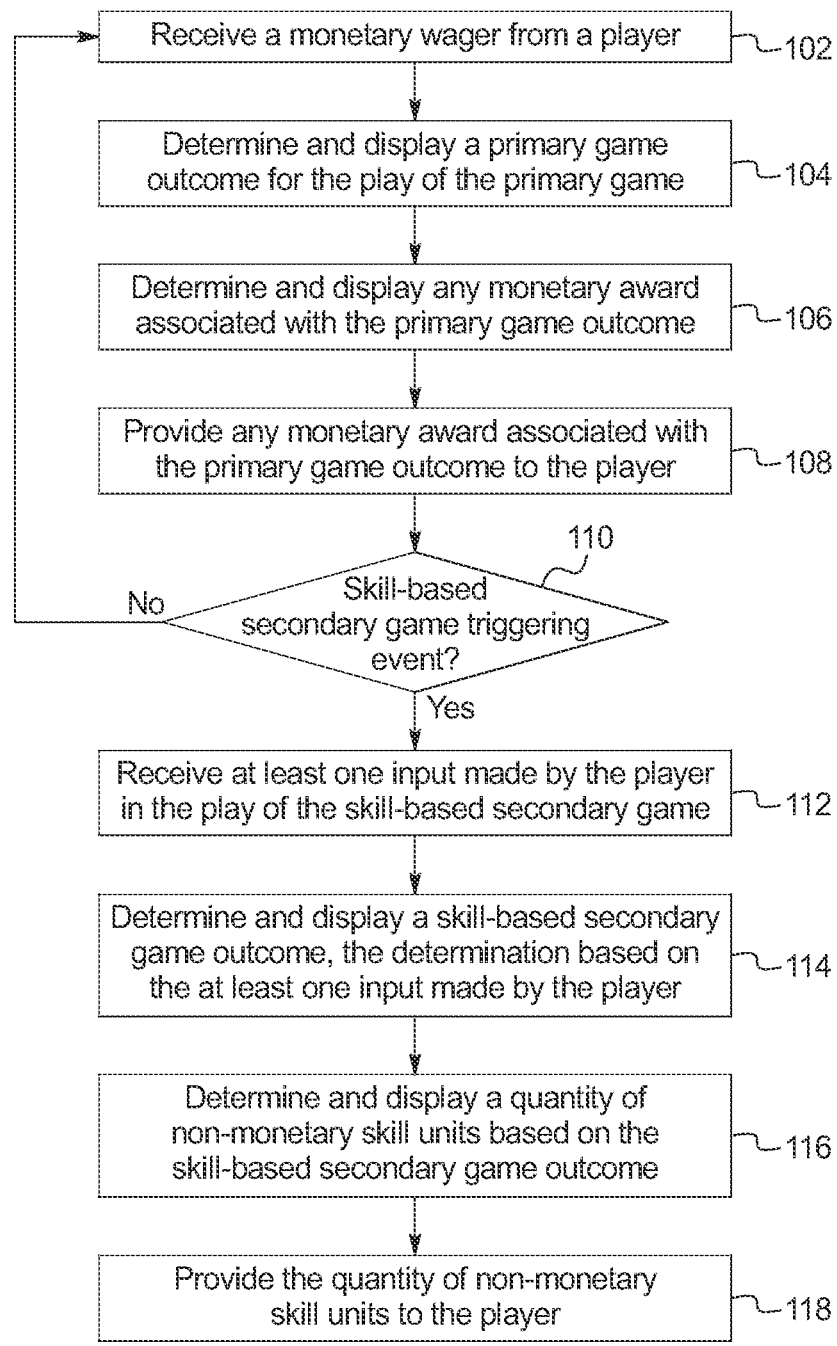

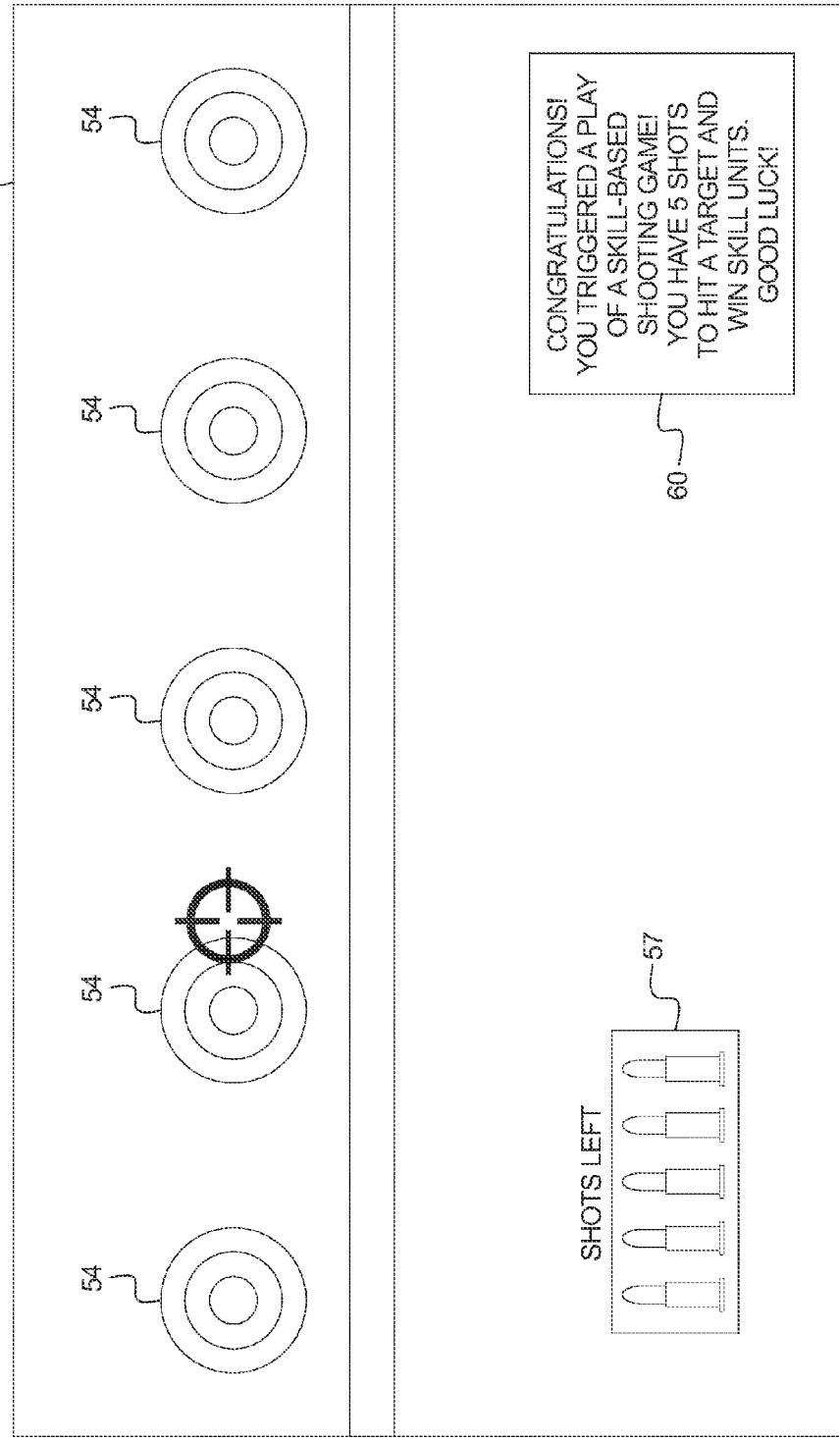

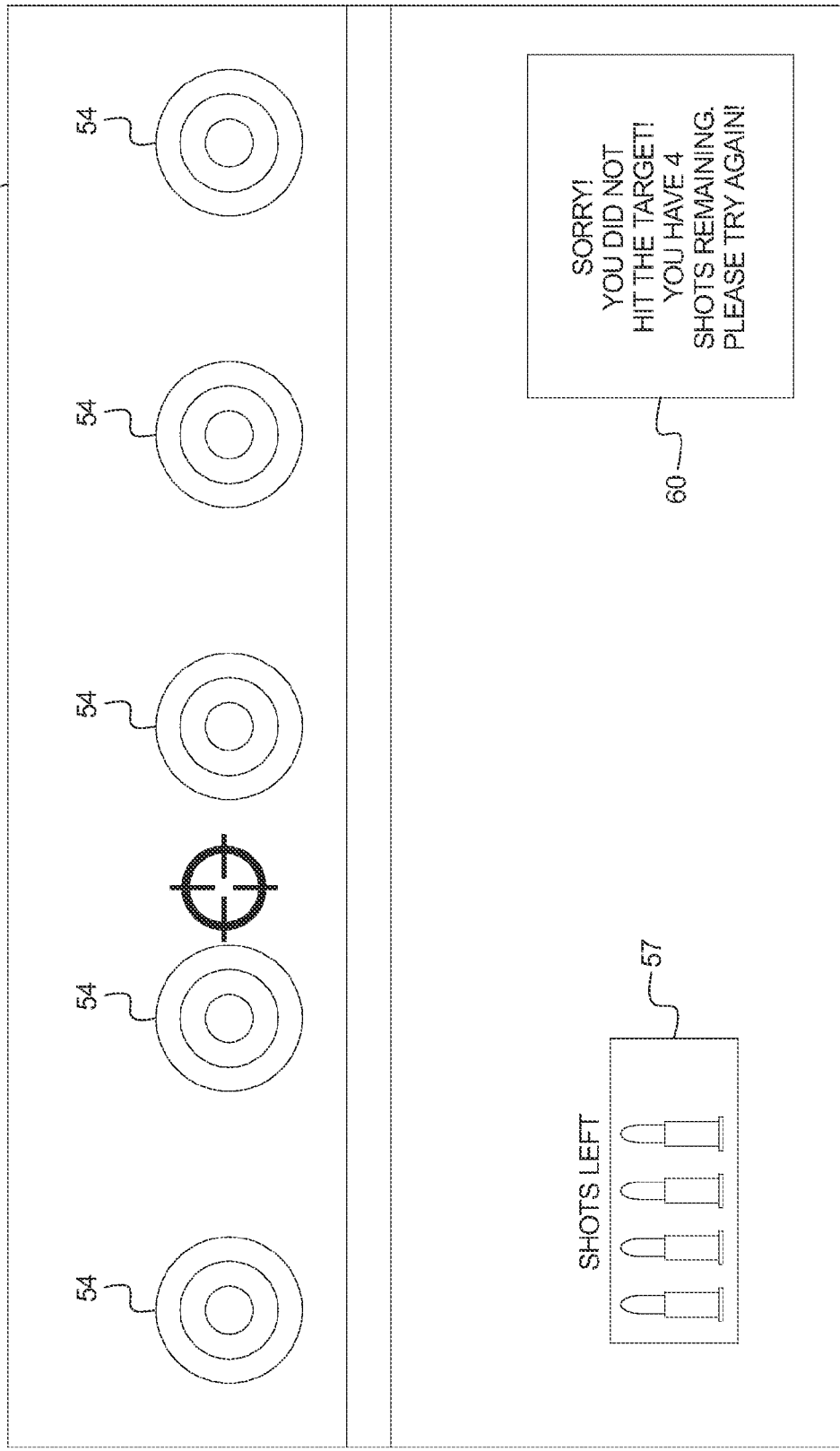

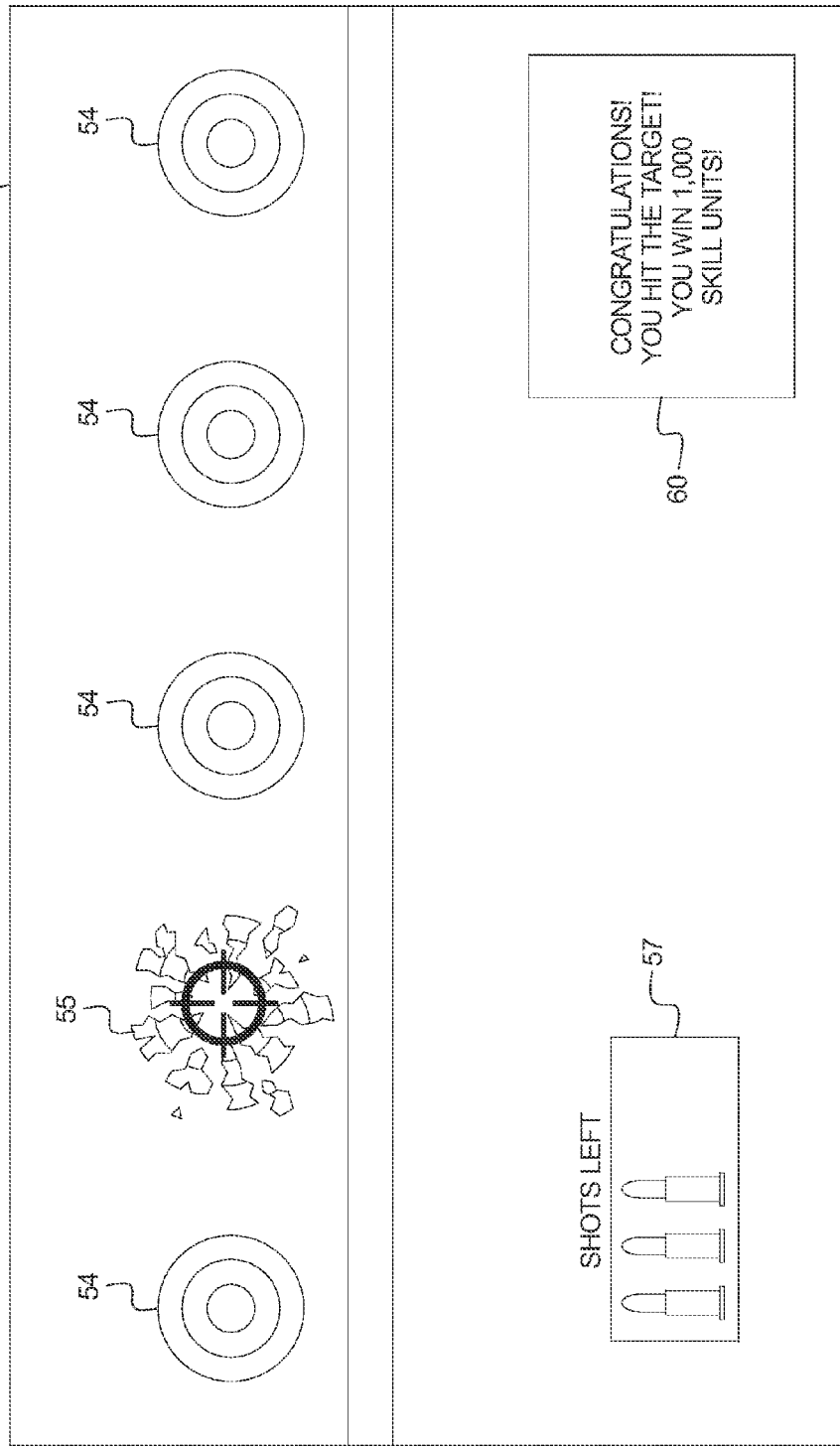

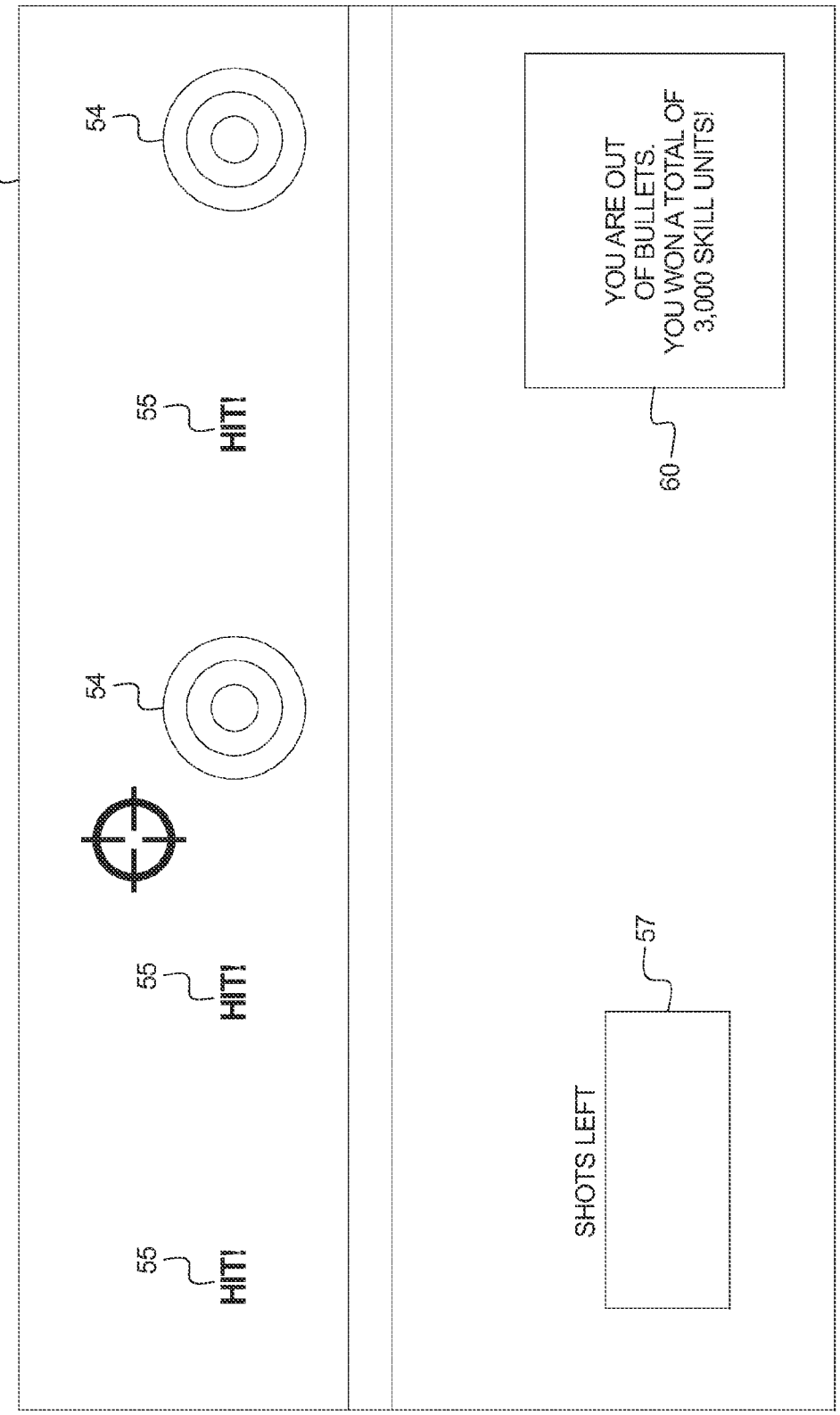

FIG. 5A

| VIRTUAL MARKETPLACE | |
|---|---|
| GOOD | REDEMPTION AMOUNT (SKILL UNITS) |
| SWORD | 100 |
| HAT FOR AVATAR | 150 |
| VIRTUAL PET | 500 |
| ACCESS TO HUNTING GAME | 600 |
| • • • | • • • |
| | SKILL UNIT BALANCE: 10,000 |
| CONTINUE | CANCEL |

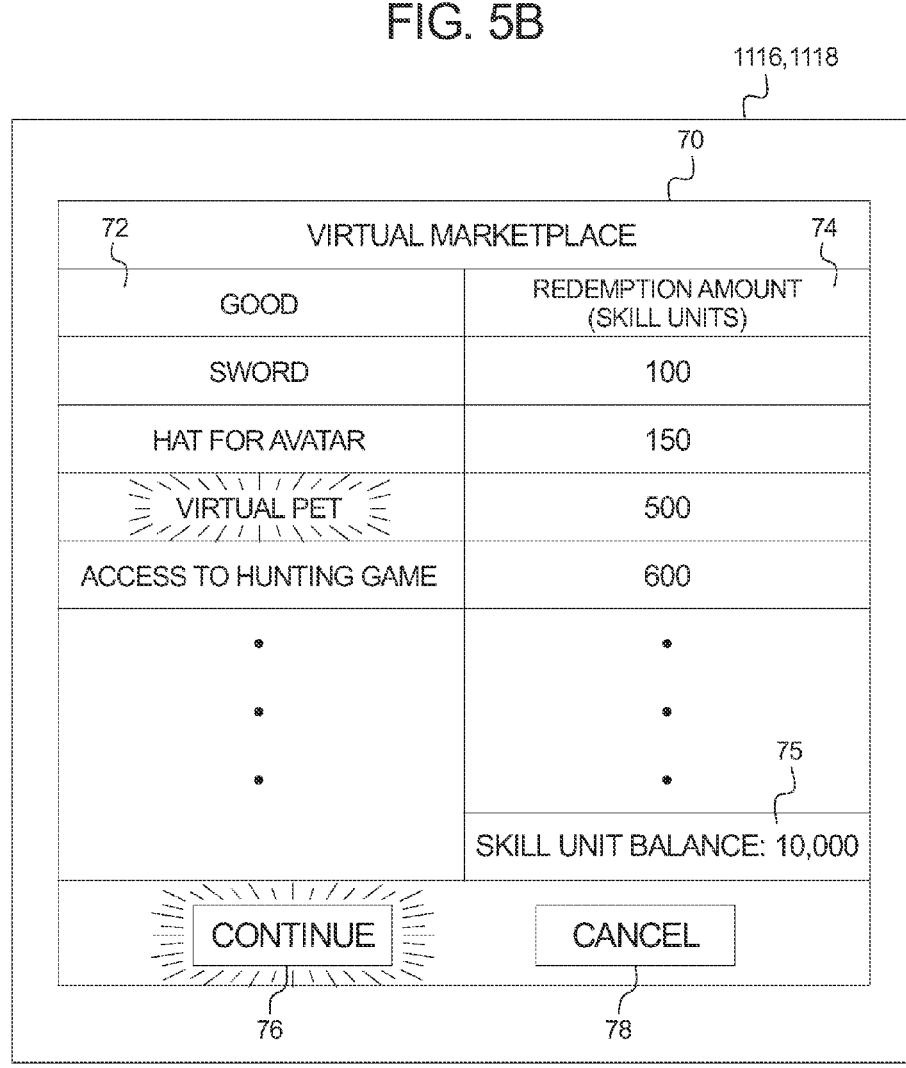

FIG. 5C

ARE YOU SURE YOU WANT
TO REDEEM 500 OF YOUR SKILL
UNITS FOR THE VIRTUAL PET?

YES    NO

FIG. 5D

CONGRATULATIONS!
YOU NOW HAVE A VIRTUAL PET.
500 SKILL UNITS HAVE BEEN
DEDUCTED FROM YOUR ACCOUNT.
CURRENT SKILL UNIT BALANCE: 9,500.

GAMING SYSTEM AND METHOD FOR PROVIDING A SKILL-BASED GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming devices. The secondary or bonus games usually provide an additional award to the player. Secondary or bonus games usually do not require an additional wager by the player to be activated. Many secondary or bonus games are generally activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

Primary wagering games of gaming devices in most jurisdictions are games of luck, not games of skill. For instance, in slot machines, the player must make a wager on the slot game to begin the slot game, and the gaming machine randomly determines the outcome for the slot game. The outcome may be a winning outcome or a losing outcome. The outcome determines whether the player obtains an award according to the paytable of the slot machine. The paytables and winning combinations of the slot machine are predetermined or static.

One reason slot machines are popular, is because an amateur, novice or inexperienced player can play most slot machines at the player's own pace, with no required skills, strategy or risk evaluation and perform as well as a seasoned or experienced slot game player. Most slot machines are set to pay back on average between 80 and 99 percent of the amounts that the players wager. In most modern slot machines, a processor controlling the slot machine randomly determines the outcomes and thus the awards. In other slot machines, a central server determines the awards and sends the awards to a plurality of slot machines. The central server determines such awards from a pool of potential awards, where each award of the pool must be eventually provided to a player. The central server picks each award randomly from the pool.

Certain wagering gaming devices such as video poker and blackjack involve certain player strategy or decision-making. The player decides which cards to hold in draw-type poker games and whether to take additional cards in blackjack-type card games. These games generally require a certain level of strategy to be successful. Further, some secondary or bonus games triggered in a primary wagering game require a player to risk an award won to potentially achieve a higher award. These games also can generally be said to require a certain level of strategy to be successful.

Certain other bonus or secondary games triggered in a primary wagering game also employ skill, apparent skill or pseudo skill. In certain of these bonus games, the awards are generally randomly determined. The player's participation in the skill, apparent skill or pseudo skill event may, for instance, determine the timing of when the player gets the awards. In another known gaming device, the player skill can determine which set or pool of awards will be used to determine the award provided to the player in the game. The processor of the gaming device randomly determines the award from the determined set or pool of awards to provide to the player.

Wagering games of gaming devices in certain jurisdictions are required to involve a skill event such as an event requiring player dexterity to be successful. These games cannot turn purely upon a random outcome. These gaming machines require strategy or timing of inputs by the player to determine chance of success and failure. If the player does not play optimally, the actual payout percentage of the gaming machine will decrease accordingly.

Most known gaming devices determine whether to provide a player any primary game awards in accordance with a primary game paytable and/or any secondary game awards in accordance with a secondary game paytable. For a play of a primary game, the primary game paytable has an average expected primary game payout based on a percentage of generating each primary game outcome and an award amount associated with each primary game outcome. Further, for a play of the secondary game, the secondary game paytable has an average expected secondary game payout based on a percentage of generating each secondary game outcome and an award amount associated with each secondary game outcome. Primary game paytables include a likelihood of a triggering event associated with the secondary game. Accordingly, the average expected primary game payout plus the average expected secondary game payout form the total average expected payout of the gaming device. For example, for each $1.00 wagered, if the average expected primary game payout of a primary game paytable is $0.80 (i.e., an average expected primary game payout percentage of 80%) and the average expected secondary game payout of a secondary game paytable is $0.18 (i.e., an average expected secondary game payout percentage of 18%), then the total average expected payout of the gaming device is $0.98 for each $1 wagered (i.e., the gaming device has an average expected payout percentage of 98%). It should be appreciated that different wager amounts are associated with different primary game paytables and/or different secondary game paytables.

Wagering games which are purely skill games or partial skill games present certain problems for game designers and gaming establishments. First, skill games can be mastered by players having a high level of skill, substantial practice or both. To combat the mastering of such games and to make the economics work, a game designer may have to make the skill game relatively difficult. The difficulty level may be too great for inexperienced or average players to have a sufficient level of success and enjoyment at the gaming machines. Such players may not have a good gaming experience and may not repeat play on the gaming machines.

Further, skill games are generally interactive and are enjoyable for certain people to play. Many people have especially grown accustomed to and comfortable with playing arcade skill games, home video skill games, computer skill games, handheld device skill games, and data network (e.g., internet) skill games. Some of these people may not want to play games of conventional gaming devices which are purely based on randomly generated outcomes and involve no skill or little skill. Some of these people also enjoy the competitive nature of skill games which are not provided by known conventional wagering games of gaming machines.

Certain regulators have established various restrictions on the award payout percentages for gaming devices that incorporate skill-based games because certain skill players excel at skill-based games and thus, on average, win more awards than lower skilled players. Accordingly, certain players may feel as though the award payout percentages are not commensurate with their skill levels. In addition, certain known gaming devices incorporate the average expected payout percentage of any skill-based games into the total average expected payout percentage of the gaming devices. Accordingly, the paytables of the gaming devices are constrained by the awards of the skill-based games.

There is a continuing need to provide new and different gaming systems and methods which provide awards for skill-based games that are neither limited by regulations nor incorporated into paytable percentages.

There is also a continuing need to provide new and different gaming systems and methods which cater to higher skilled players while still accommodating lesser skilled players when determining which awards are provided to such player.

SUMMARY

The present disclosure relates generally to gaming systems and methods for providing skill-based gameplay incentivized by non-monetary skill units.

In various embodiments, the gaming system and method disclosed herein provides a primary game in which the gaming system provides monetary awards to a player and a secondary game in which the gaming system provides non-monetary skill units to the player. In one embodiment, the skill unit is a new gaming currency which is in addition to and different than current known gaming establishment currencies, such as monetary credits, promotional credits, and player tracking points. The gaming system provides these non-monetary skill units to players during plays of one or more skill-based games. The gaming system can have a greater average expected payout percentage for the primary game (and thus provide players the additional benefit of playing the primary game in accordance with a more lucrative primary game paytable) because the skill units have no monetary value and because such skill units are the award currency from all plays of any skill-based secondary games. Additionally, the gaming system is not limited or regulated in the amount or distribution of the skill units that it provides to players, or in the amount of times that it initiates or triggers plays of the skill-based secondary games.

In one operational embodiment of the gaming system disclosed herein, the gaming system enables a player to place a wager on a play of a primary game. In this embodiment, the gaming system provides the player with any monetary credits or monetary awards associated with a generated primary game outcome. If a triggering event occurs, the gaming system initiates a play of a skill-based secondary game. In the skill-based secondary game, the gaming system enables the player to make zero, one, or more quantifiable inputs (i.e., which tends to measure one or more aspects of that player's skills). In one embodiment, the gaming system determines a player's score for the skill-based game based on the quantifiable inputs, and provides an amount of skill units to the player based on the player's score. It should be appreciated that providing skill units in the skill-based game is separate from and in addition to providing monetary awards in the primary game.

In one embodiment, following any accumulation of any skill units in association with a play of the secondary game (and/or in response to an occurrence of a skill unit redemption event), the gaming system enables the players to redeem any accumulated skill units for one or more virtual goods or items. In different embodiments, the gaming system displays a virtual marketplace including a plurality of virtual goods or items, such as virtual goods related to a virtual profile of the player (e.g., upgrades or add-ons to players' avatars), or abilities to unlock the play of certain skill-based levels or skill-based games accessible by the players. In these embodiments, each of the virtual goods has an associated redemption amount whereby a player obtains a specific virtual good by redeeming an amount of skill units according to the redemption amount of that specific virtual good. The ability to obtain virtual goods for a player's avatar provides an increased level of excitement and enjoyment for certain players.

It should be appreciated that the combination of the wager-based primary game with the skill-based secondary game incentivizes players with both the potential for a monetary award from the primary game and the potential for a skill unit award from the skill-based secondary game. The gaming system and method of the present disclosure provides more lucrative awards to the player in the play of the primary game because the skill-based game offers skill units with no monetary value that need not be incorporated into the paytable of the gaming system. For example, a gaming device with a 60%/35% average expected payout percentage split between the primary game and the secondary game can now have a 95% average expected primary game payout percentage (in addition to the ability to provide skill units in the skill-based secondary game). Further, the non-monetary nature of the skill units enables certain skill players to take advantage of their full skill set during play of the skill-based game because the gaming device enables skill units that are more commensurate with the skill levels of the players versus monetary skill awards that are regulated according to certain established limits. Additionally, the gaming system and method is not limited as to the frequency of instances or types of the skill-based secondary game associated with a play of a primary game.

Additional features and advantages are described in, and will be apparent from, the following Detailed Description and the figures.

BRIEF DESCRIPTION OF THE FIGURES

FIG. 1 is a flow chart of an example process for operating a gaming system providing one embodiment of the skill-based gameplay incentivized by non-monetary skill units disclosed herein.

FIGS. 2A, 2B, 2C, and 2D are each front perspective views of displays provided by one embodiment of the gaming system disclosed herein, and illustrating a skill-based secondary game wherein a player attempts to successfully hit one or more targets to win skill units.

FIGS. 5A, 5B, 5C, and 5D are each front perspective views of displays provided by one embodiment of the gaming system disclosed herein, and illustrating a virtual marketplace wherein a player redeems skill units for virtual goods.

DETAILED DESCRIPTION

Figure 3:
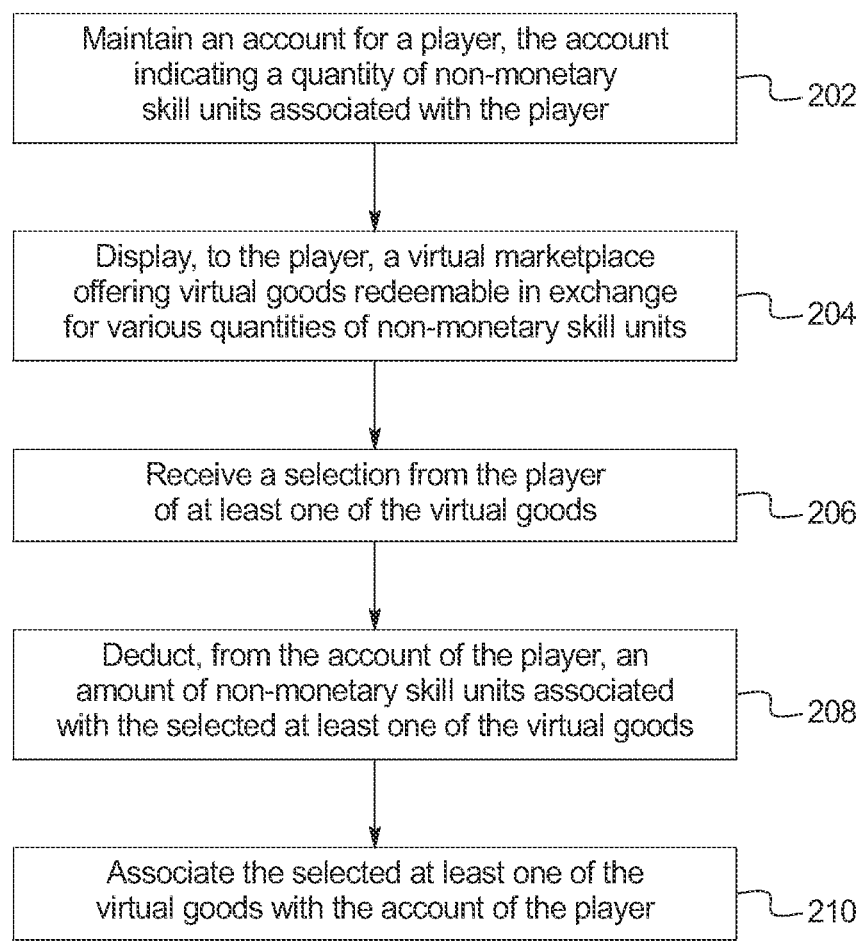
FIG. 3 is a flow chart of an example process for providing a virtual marketplace offering goods redeemable for non-monetary skill units.

In various embodiments, the gaming system and method disclosed herein provides a primary game in which the gaming system provides monetary awards to a player and a skill-based secondary game in which the gaming system provides non-monetary skill units to the player. In some embodiments, the gaming system can have a greater average expected payout percentage for the primary game because the skill units have no monetary value and because such skill units are the award currency of any plays of any skill-based secondary games. Additionally, the gaming system is not limited or regulated in the amount or distribution of the skill units that it provides to players. Moreover, the gaming system is not limited as to the frequency of instances or types of the skill-based secondary games associated with a play of a primary game.

While the embodiments described below are directed to a primary wagering game (wherein players place monetary wagers and win monetary awards) and a secondary skill-based game (wherein players win non-monetary skill units not redeemable for any monetary value or money), it should be appreciated that the present disclosure may alternatively be employed in association with a primary wagering game (wherein players win non-monetary skill units) and a secondary game (wherein players win monetary awards in association with a monetary wager). It should be further appreciated that in certain embodiments in which the present disclosure is employed in association a secondary game, the gaming system enables a player to win both monetary awards and non-monetary skill units in association with the secondary game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Referring now to FIG. 1, a flowchart of an example process for operating a gaming system or a gaming device disclosed herein is illustrated. Particularly, the process relates to operating a primary game and a skill-based secondary game for play by a player of the gaming system. In one embodiment, this process is embodied in one or more software programs stored in one or more memories and executed by one or more processors or controllers. Although this process is described with reference to the flowchart illustrated in FIG. 1, it should be appreciated that many other methods of performing the acts associated with this process may be used. For example, the order of certain of the blocks described may be changed, or certain of the blocks described may be optional.

In operation of this embodiment, the gaming system receives a monetary wager from a player as indicated in block 102. The gaming system initiates a play of the primary game by the player in response to receiving the wager. Following the receipt of the wager, the gaming system determines and displays a primary game outcome for the play of the primary game as indicated in block 104. The gaming system determines and displays any monetary award associated with the determined primary game outcome as indicated in block 106. The gaming system then provides any monetary award associated with the primary game outcome to the player as indicated in block 108.

The gaming system also determines if a triggering event associated with a skill-based secondary game has occurred as indicated in block 110. In certain embodiments, the skill-based game triggering event occurs based on a displayed event associated with a wagered-on play of a primary game. In other embodiments, the skill-based game triggering event occurs based on an event independent of any displayed event associated with a wagered-on play of a primary game.

If the gaming system determines that the triggering event has not occurred, then the gaming system returns to block 102 and enables the player to place another wager for another play of the primary game. In contrast, if the gaming system determines that the triggering event has occurred, then the gaming system initiates a play of the skill-based secondary game.

In one embodiment, the gaming system receives at least one input made by the player in the play of the skill-based secondary game as indicated in block 112. In one embodiment, the gaming system accumulates a quantity of points for the player based on one or more player inputs. In this embodiment, the player's accumulated quantity of points form a player's score. That is, a skill-based point accumulation event occurs when the gaming system provides the player one or more points based on one or more aspects of the player's skill in the skill-based game. It should be appreciated that for purposes of this disclosure, skill includes: (i) physical skill, such as, but not limited to: timing, aiming, physical strength or any combination thereof which is quantifiable by zero, one or more inputs made by the player in association with the skill-based game; (ii) mental skill (i.e., knowledge, reasoning, and/or strategy) which is quantifiable by zero, one or more inputs made by the player in association with the skill-based game; and (iii) any other type of player skill which is quantifiable by zero, one or more inputs made by the player in association with the skill-based game.

In one embodiment, the skill-based game is a conventional arcade game. In this embodiment, the gaming system includes an arcade game which is physically similar in appearance and function to a conventional arcade game or arcade machine. For example, the gaming system includes original arcade games such as Space Invaders, Asteroids, Pac Man and Dig Dug; casual arcade games such as Tetris and Bejeweled; first person shooter games such as Quake and Tomb Raider; multiplayer online role playing games such as Second Life; and simulation arcade games such as bowling and pinball.

In one embodiment, after the gaming system ends play of the skill-based game, the gaming system determines and displays a skill-based secondary game outcome, wherein the determination is based on the at least one input made by the player as indicated in block 114. In one embodiment, the skill-based secondary game outcome indicates the player's score determined from the skill-based point accumulation event(s). The gaming system determines and displays a quantity of non-monetary skill units based on the skill-based secondary game outcome as indicated in block 116. In one embodiment, the quantity of non-monetary skill units is based on a paytable or a formula. Particularly, the gaming system examines a table or similar data listing that includes a plurality of possible skill-based secondary game outcomes matched to a plurality of associated non-monetary skill units. Further, the gaming system matches the player's skill-based secondary game outcome with the associated quantity of non-monetary skill units. For example, if the player accumulates five thousand points during play of the skill-based game (i.e., the skill-based secondary game outcome), and the table indicates that five thousand points corresponds to five hundred skill units, then the gaming system determines that five hundred non-monetary skill units should be provided to the player. In one embodiment, the gaming system scales the non-monetary skill units based on the wager in the primary game. For example, if the minimum wager for the primary game is $1 and the player wagers $5, then the gaming system multiplies the non-monetary skill unit award by a factor of five (5). It should be appreciated that the non-monetary skill units are in addition to and different than current known gaming establishment currencies, such as monetary credits, promotional credits, and player tracking points.

In one embodiment, the gaming system provides the quantity of non-monetary skill units to the player as indicated in block 118. In this embodiment, the gaming system associates the quantity of non-monetary skill units with an account of the player. In some cases, the gaming system adds the quantity of non-monetary skill units to an accumulated amount of non-monetary skill units associated with the player's account. According to embodiments, the non-monetary skill units are not redeemable for monetary value, cash, monetary credits, or promotional credits. Further, although players can use money to purchase non-monetary skill units, players are not able to redeem any non-monetary skill units for anything of monetary value.

The gaming system disclosed herein has a greater average expected payout percentage for the primary game because the gaming system does not incorporate the skill units into its monetary paytable (i.e., the skill units have no monetary value and thus are separate from any monetary paytable). As a result, in some embodiments, the gaming system offers, in its primary game, 1) more winning combinations, 2) a greater frequency of existing winning combinations, and/or 3) larger awards associated with each of the winning combinations.

Additionally, the gaming system is not limited as to how many skill-based secondary game triggering events are associated therewith, and is therefore not limited as to the frequency of initiating skill-based secondary games, because the gaming system does not incorporate the skill units into its monetary paytable. For example, the gaming system initiates multiple skill-based secondary games in response to a triggering event associated with the primary game. In some embodiments, the gaming system initiates a skill-based secondary game that provides non-monetary skill units in association with initiating a primary game and a secondary game that both provide monetary awards.

Referring to FIG. 2A, an example interface of a skill-based secondary game is illustrated. The gaming system displays, in an indicator 60, appropriate messages such as "CONGRATULATIONS!" and "YOU TRIGGERED A PLAY OF A SKILL-BASED SHOOTING GAME!" to the player visually, or through suitable audio or audiovisual displays. In the skill-based secondary game, the player is provided opportunities to try to win a quantity of skill units by attempting to shoot one of a plurality of moving targets 54 with one or more bullets 57. In this illustrated example, the player has five opportunities in the form of five bullets (or shots) which are displayed to the player in the indicator 60. The gaming system displays appropriate messages such as "YOU HAVE 5 SHOTS TO HIT A TARGET AND WIN SKILL UNITS" and "GOOD LUCK!" to the player visually, or through suitable audio or audiovisual displays. In one embodiment, the gaming system provides more skill units to the player for the fewer amount of bullets that the player needs to hit one of the targets. For example, if the player hits a target with the first bullet, the gaming system provides 1,200 skill units to the player; if the player misses a target with the first bullet and hits a target with the second bullet, the gaming system provides 1,000 skill units to the player; and so on.

As seen in FIG. 2B, the player's first shot does not result in the first bullet striking one of the moving targets 54. Accordingly, the gaming system displays appropriate messages in the opportunity indicator 60 such as "SORRY! YOU DID NOT HIT THE TARGET," "YOU HAVE 4 MORE SHOTS REMAINING," and "PLEASE TRY AGAIN!" to the player visually, or through suitable audio or audiovisual displays. As seen in FIG. 2C, the player's second shot successfully strikes one of the moving targets 54, and the gaming system determines a corresponding amount of skill units associated with the target strike (as shown: 1,000 skill units). Accordingly, the gaming system displays appropriate messages in the opportunity indicator 60 such as "CONGRATULATIONS! YOU HIT THE TARGET!" and "YOU WIN 1,000 SKILL UNITS!" to the player visually, or through suitable audio or audiovisual displays.

As seen in FIG. 2D, the gaming system determines that the player is out of bullets 57 and displays an appropriate message in the opportunity indicator 60 such as "YOU ARE OUT OF BULLETS" to the player visually, or through suitable audio or audiovisual displays. Further, the gaming system determines that the player hit a total of three targets, as indicated by 55, and determines a corresponding amount of skill units to provide to the player (as shown: 3,000 skill units). Accordingly, the gaming system displays an appropriate message in the opportunity indicator 60 such as "YOU WIN A TOTAL OF 3,000 SKILL UNITS!" to the player visually, or through suitable audio or audiovisual displays. In one embodiment, the gaming system provides the skill units to the player by crediting an account of the player with 3,000 skill units. In another embodiment, after providing the skill units to the player, the gaming system ends the skill-based game and returns to a play of a primary game.

It should be appreciated that the gaming system provides skill units to players based on various quantifiable skill inputs made by players in plays of the skill-based games, as well as based on the player attaining various goals. In one embodiment, the gaming system provides skill units to a player for accumulating a better score than another player in a play of a skill-based game. In another embodiment, the gaming system provides skill units to a player for performing a certain maneuver during a play of a skill-based game. In another embodiment, the gaming system provides skill units to a player for an amount of time that the player spends playing the skill-based game. In another embodiment, the gaming system provides skill units to a player for the player achieving an accomplishment related to the skill-based game, such as placing on a leaderboard or maintaining a certain position on a leaderboard for a certain period of time.

In one embodiment, the gaming system enables the player to select whether the skill-based secondary game is to be played for the potential of both non-monetary skill units and monetary awards. In this embodiment, the paytable and associated average expected payout percentage of the gaming system incorporates any potential monetary awards of the skill-based secondary game. Further, any non-monetary skill units that the gaming system provides to players in the play of the secondary game are not included in the monetary paytable of the primary game and the associated total average expected payout percentage of the gaming system. In certain embodiments, the gaming system enables the player to select whether the primary game will be played for the potential of a monetary award and any secondary game will be played for the potential of non-monetary skill units.

In one embodiment, prior to accumulating any skill units on behalf of a player, the gaming system determines whether an enrollment event occurred. When a skill-based game enrollment event occurs, the gaming system determines whether the player has previously enrolled to participate in the skill-based game. In one such embodiment, upon an occurrence of a skill-based game triggering event, a skill-based game enrollment event occurs when a player submits (such as inserting) a player tracking card or inputs other identification into the gaming system. In this embodiment, although the skill-based game enrollment is tied to the player tracking card, any skill units associated with the player tracking card are separate from any accumulated player tracking points. In another such embodiment, a skill-based game enrollment event occurs when an unidentified player places a wager on a play of a primary game. In another such embodiment, a skill-based game enrollment event occurs when a player begins play at a dedicated account-based gaming machine that is configured to play with a specific player.

In one embodiment, if the player has not previously enrolled to participate in the skill-based game, the gaming system enables the player to design or select one or more characteristics or icons of a participant (e.g., an avatar) associated with that player. For example, in designing a participant, the gaming system enables the player to select one or more of a gender, clothing, body characteristics or features, facial characteristics or features, and/or celebration sounds or catch-phrases. On the other hand, if the player has previously enrolled to participate in the skill-based game, the gaming system accesses a previously designed participant associated with the player. In one such embodiment, if the player has obtained any virtual goods (from purchasing such virtual goods and/or winnings such virtual goods in association with one or more plays of one or more primary games and/or previous plays of the skill-based games), the gaming system enables the player to modify their existing designed participant with such virtual goods.

In one embodiment, the gaming system additionally determines if a skill unit accumulation event occurs. If the skill unit accumulation event occurs, the gaming system provides a quantity of skill units to the player based on the skill unit accumulation event. In one embodiment, if a plurality of skill unit accumulation events occur during play of the skill-based game, the gaming system accumulates one or more skill units for the player for each one of the skill unit accumulation events. In one embodiment, the gaming system accumulates different quantities of skill units for the player based on different skill unit accumulation events which occur.

In one embodiment, the skill units are associated with an expiration date and time. In this embodiment, the gaming system is configured to communicate to the player the proximity of the expiration of any skill units (i.e., "your skill units will expire at 6:00 am tomorrow"). In one embodiment, such notice of expiration of skill units is at the player's currently played gaming device. In another embodiment, such notice of expiration of skill units is external from the player's currently played gaming device, such as via e-mail. In different embodiments, skill units accumulated at different times are redeemed in order of expiration (first to expire shows first), or in order of first earned basis.

In one embodiment, any accumulated skill units are stored or escrowed for the player completely independent of the player's player tracking account, either in the player's player tracking account or in a separate account. In this embodiment, the stored data includes, but is not limited to, the player's name, the player's skill unit account number, the date/time of earning the skill units, any expiration of the skill units, and/or any other suitable criteria, hi another embodiment, any accumulated skill units are stored in association with a player's player tracking account. In this embodiment, the stored data includes, but is not limited to, the player's name, the player's player tracking account number, the date/time of earning the skill units, any expiration of the skill units, and/or any other suitable criteria. In certain embodiments, the player uses player tracking points to purchase skill units but is not able to use skill units to purchase player tracking points because the skill units are not redeemable for anything of monetary value.

In embodiments, the gaming system enables the player to redeem the skill units via any type of portal or interface. For example, the player redeems the skill units via a virtual marketplace as described herein. In a further example, the player accesses a skill unit account and redeems the skill units via an application installed on a mobile device.

Referring now to FIG. 3, a flowchart of an example process for operating a gaming system or a gaming device, and particularly for providing a virtual marketplace offering goods redeemable for non-monetary skill units, is illustrated. In one embodiment, this process is embodied in one or more software programs stored in one or more memories and executed by one or more processors or controllers. Although this process is described with reference to the flowchart illustrated in FIG. 3, it should be appreciated that many other methods of performing the acts associated with this process may be used. For example, the order of certain of the blocks described may be changed, or certain of the blocks described may be optional.

In operation of this embodiment, the gaming system maintains an account for the player, the account indicating a quantity of non-monetary skill units associated with the player as indicated in block 202. In this embodiment, as described above, the gaming system provides the non-monetary skill units to the player during play of one or more skill-based games, and associates the provided non-monetary skill units with the account of the player. The gaming system displays, to the player, a virtual marketplace offering virtual goods redeemable in exchange for various quantities of non-monetary skill units as indicated in block 204. In one embodiment, the virtual goods are upgrades to a player's avatar or representation, abilities to access various skill-based levels or skill-based games, virtual items for use in a virtual environment, and/or similar virtual goods. In one embodiment, the virtual good is an ability to access one or more plays of a non-monetary online game.

In one embodiment, the gaming system receives a selection from the player of at least one of the virtual goods as indicated in block 206. The gaming system deducts, from the account of the player, an amount of non-monetary skill units associated with the selected at least one of the virtual goods as indicated in block 208. In one embodiment, the gaming system associates the selected at least one of the virtual goods with the account of the player as indicated in block 210. Particularly, the player's account or profile reflects the addition or association of the selected at least one of the virtual goods.

Figure 4:
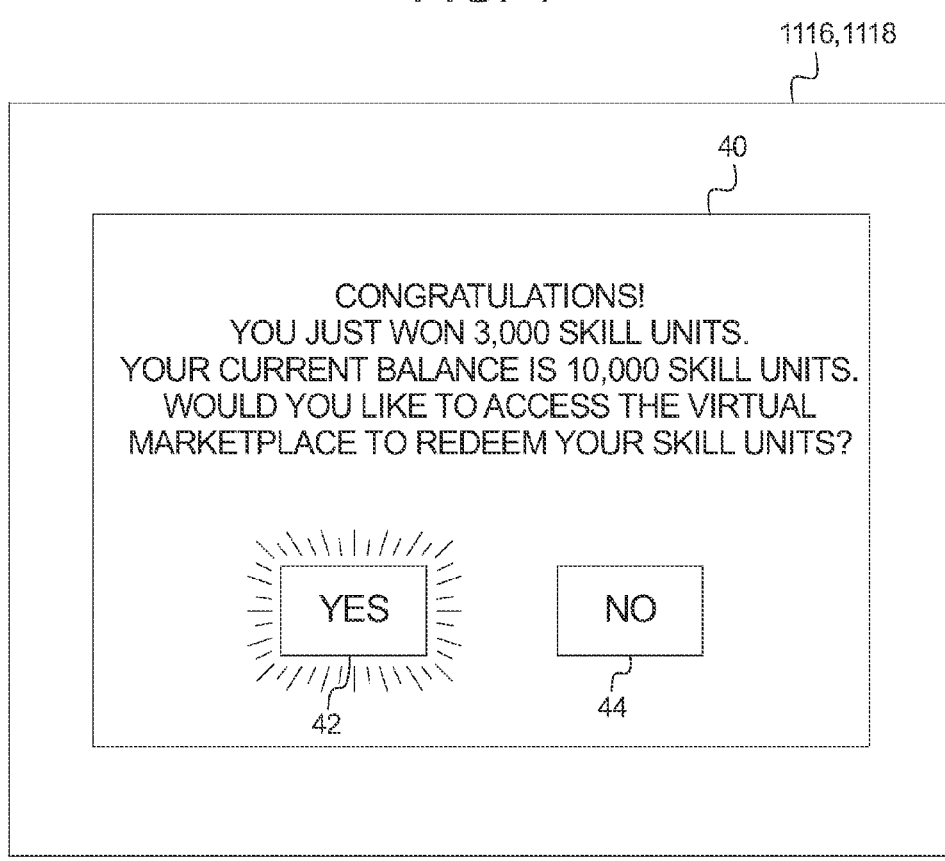
FIG. 4 is a front perspective view of a display provided by one embodiment of the gaming system disclosed herein illustrating an initiation of a virtual marketplace.

Referring to FIG. 4, an example interface 40 is illustrated. According to embodiments, the gaming system displays the example interface 40 upon completion of the skill-based game by the player. The gaming system displays appropriate messages such as "CONGRATULATIONS!" and "YOU JUST WON 3,000 SKILL UNITS" to the player visually, or through suitable audio or audiovisual displays. Further, the gaming system indicates a current skill unit balance for the player by displaying appropriate messages such as "YOUR CURRENT BALANCE IS 10,000 SKILL UNITS" to the player visually, or through suitable audio or audiovisual displays. In one embodiment, the gaming system allows the player to access a virtual marketplace to redeem one or more of the player's skill units by displaying appropriate messages such as "WOULD YOU LIKE TO ACCESS THE VIRTUAL MARKETPLACE TO REDEEM YOUR SKILL UNITS?" to the player visually, or through suitable audio or audiovisual displays. The gaming system displays, in the interface 40, an option to access the virtual marketplace ("YES," 42) and an option to decline ("NO," 44).

In one embodiment, if the player selects the "YES" option 42, the gaming system initiates a virtual marketplace that allows players to redeem skill units for virtual goods. Further, in one embodiment, if the player selects the "NO" option 44, the gaming system displays the primary game to the player and, in some cases, receives a wager from the player for an additional play of the primary game.

Referring to FIG. 5A, an example interface 70 of a virtual marketplace is illustrated. According to different embodiments, the gaming system displays the interface 70 to the player upon completion of a skill-based game or upon the player selecting to browse the virtual marketplace. In one embodiment, the virtual marketplace displays a plurality of virtual goods 72 that are redeemable in exchange for various redemption amounts of non-monetary skill units. Particularly, the gaming system maintains an account for the player, wherein the account indicates a quantity of non-monetary skill units associated with the player and that are accumulated during one or more plays of the skill-based games as discussed herein. In one embodiment, the interface 70 includes a skill unit balance indicator 75 that displays a current skill unit balance for the associated player. For example, as shown in FIG. 5A, the player has 10,000 skill units associated with the player's account.

The virtual goods 72 of the virtual marketplace each have an associated redemption amount 74, in skill units. For example, as shown in FIG. 5A, the sword has a redemption amount of 100 skill units, the virtual pet has a redemption amount of 500 skill units, and so on. In one embodiment, the interface 70 includes a continue selection 76 and a cancel selection 78 to facilitate the navigation and operation of the virtual marketplace. As shown in FIG. 5A, the continue selection 76 is dashed to indicate that it is not selectable unless the player selects one of the virtual goods from the virtual goods column 72.

In one embodiment, the player browses the virtual marketplace and selects one or more virtual goods to redeem in exchange for the corresponding amount of skill units. Referring to FIG. 5B, the player selects the "VIRTUAL PET" selection from the virtual goods column 72. Further, the gaming system updates the interface 70 in response to the selection so that the continue selection 76 is selectable. The player selects the continue selection 76 and, in response to the selection, the gaming system displays a confirmation dialogue 80 as illustrated in FIG. 5C. Particularly, the gaming system displays an appropriate message such as "ARE YOU SURE YOU WANT TO REDEEM 500 OF YOUR SKILL UNITS FOR THE VIRTUAL PET?" to the player visually, or through suitable audio or audiovisual displays. Further, the confirmation dialogue 80 includes a "YES" option 82 and a "NO" option 84.

If the player selects the "YES" option 82, the gaming system deducts the appropriate amount of skill units from the player's account and associates the selected virtual good with the player's account. As shown in FIG. 5D, the gaming system displays a redemption dialogue 86. Particularly, the gaming system displays an appropriate message such as "CONGRATULATIONS! YOU NOW HAVE A VIRTUAL PET. 500 SKILL UNITS HAVE BEEN DEDUCTED FROM YOUR ACCOUNT" to the player visually, or through suitable audio or audiovisual displays. In one embodiment, the gaming system deducts the corresponding amount of skill units from the player's account in response to the redemption. Continuing with the example, the gaming system deducts 500 skill units from the 10,000 total skill units of the player's account, leaving a total of 9,500 skill units in the player's account. The gaming system displays an appropriate message such as "CURRENT SKILL UNIT BALANCE: 9,500" to the player visually, or through suitable audio or audiovisual displays.

In one embodiment, as described above, the gaming system enables the player to select one or more virtual goods to redeem in exchange for the corresponding amount of skill units. In another embodiment, the gaming system enables the player to select one or more physical goods (having no monetary value) to redeem in exchange for the corresponding amount of skill units. In another embodiment, the gaming system enables the player to select one or more physical goods (having no monetary value) and/or virtual goods to redeem in exchange for the corresponding amount of skill units.

In an alternative embodiment, as mentioned above, the gaming system provides a monetary award to the player in the play of the skill-based secondary game in addition to providing skill units to the player in the play of the skill-based secondary game. In this embodiment, the monetary award is based on the wager received from the player for the play of the primary game. For example, instead of providing 500 skill units to the player for a play of the skill-based game, the gaming system provides 250 skill units and a monetary award in a 3-1 ratio of the player's wager (e.g., if the player wagers $3, then the monetary award is $9). In some embodiments, the gaming system varies the ratio of monetary awards to skill units in the play of the skill-based secondary game. In one embodiment, the gaming system factors the monetary award payout of the skill-based secondary game into total average expected payout percentage of the paytable of the gaming system. For example, for each $1.00 wagered, if the average expected primary game payout of a paytable is $0.88 (i.e., an average expected primary game payout percentage of 88%) and the total average expected payout of the paytable employed in accordance with that play of the gaming system is $0.98, then the average expected skill-based secondary game payout of the paytable is $0.10. In this embodiment, any non-monetary skill units that the gaming system provides to the player are not factored into the paytable of the gaming system.

In another alternative embodiment, the gaming system determines the skill-based secondary game outcomes based on a comparison of an amount of points that the player accumulates during play of the skill-based game with a plurality of specified ranges. For example, the gaming system provides 500 skill units to a player who accumulates, in the play of the skill-based game, an amount of points in a range of 15,001 to 20,000; provides 600 skill units to a player who accumulates, in the play of the skill-based game, an amount of points in a range of 21,001 to 25,000; and so on.

In another alternative embodiment, the gaming system enables multiple players to compete against one another in the play of the skill-based secondary games. In this embodiment, the gaming system provides skill units to players based on an order of finish, a number of points scored relative to other players, and/or other metrics or comparisons. For example, if a first player scores 100 points during a play of the skill-based secondary game and a second player scores 200 points during a play of the skill-based secondary game, the gaming system provides 50 skill units to the second player and zero skill units to the first player.

In one embodiment, the gaming system causes at least one display device of the player's gaming device to display the skill-based game. In another embodiment, in addition or in alternative to each gaming device displaying the skill-based game, the gaming system causes one or more community or overhead display devices to display part or all of the skill-based game to one or more other players or bystanders either at a gaming establishment or viewing over a network, such as the Internet. In another embodiment, in addition or in alternative to each gaming device displaying the skill-based game, the gaming system causes one or more Internet sites to each display the skill-based game such that a player is enabled to log on from a personal web browser. In another such embodiment, the gaming system enables the player to play one or more primary games on one device while viewing the skill-based game from another device, or vice-versa. For example, the gaming system enables the player to play one or more primary games (or a skill-based game) on a mobile phone while viewing the status of the skill-based game (or one or more primary games) on a desktop or laptop computer.

In another embodiment, as mentioned above, a skill-based game triggering event occurs, based on an outcome associated with one or more plays of any primary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a skill-based game triggering event to occur.

In another embodiment, as also mentioned above, the gaming system does not provide any apparent reasons to the players for a skill-based game triggering event to occur. In these embodiments, such determinations are not triggered by an event in a primary game or based specifically on any of the plays of any primary game of the gaming devices in the system. That is, these events occur without any explanation or alternatively with simple explanations.

In one embodiment, a skill-based game triggering event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a skill-based game triggering event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a skill-based game triggering event occurs, based on a predefined variable reaching a defined parameter threshold. For example, when the 500,000th player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a skill-based game triggering event occurs, based on a quantity of games played. In this embodiment, a quantity of games played is set for when one or more of such events or conditions will occur. In one embodiment, such a set quantity of games played is based on historic data.

In another alternative embodiment, a skill-based game triggering event occurs, based on time. In this embodiment, a time is set for when one or more of such events or conditions will occur. In one embodiment, such a set time is based on historic data.

In another alternative embodiment, a skill-based game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the players identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a skill-based game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a skill-based game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a skill-based game triggering event to occur may be implemented in accordance with the gaming system and method disclosed herein.

It should be appreciated that any of the above-described skill-based game triggering events may be combined in one or more different embodiments.

It should be appreciated that in different embodiments, one or more of:
  i. one or more characteristics of a player's participant;
  ii. one or more features of a player's participant;
  iii. one or more amounts of time allotted for a play of a skill-based game;
  iv. one or more quantities of skill units available for a skill-based game;
  v. one or more ranges of skill units available for a skill-based game;
  vi. one or more amounts of opportunities a player has to win skill units during a play of a skill-based game;
  vii. one or more quantities of skill units provided for various maneuvers performed by or goals reached by a player of skill-based game;
  viii. one or more maneuvers or goals associated with a skill-based game and that are eligible for a providing of skill units;
  ix. an amount of players participating in a skill-based game;
  x. one or more virtual items available in a virtual marketplace;
  xi. one or more redemption amounts for various items available in a virtual marketplace;
  xii. whether a skill unit accumulation event occurs;
  xiii. a quantity of skill unit accumulation events;
  xiv. when a skill-based game triggering event occurs;
  xv. when a skill-based game is initiated; and
  xvi. any determination disclosed herein;
is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 6A:
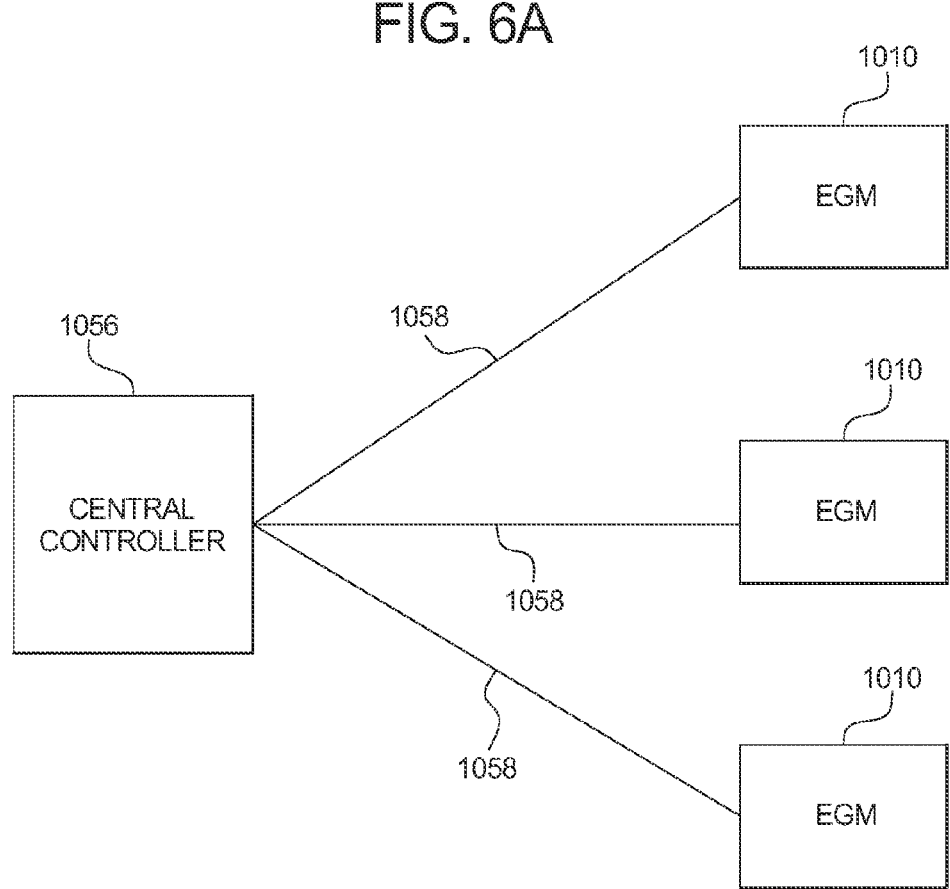
FIG. 6A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 6A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 6B:
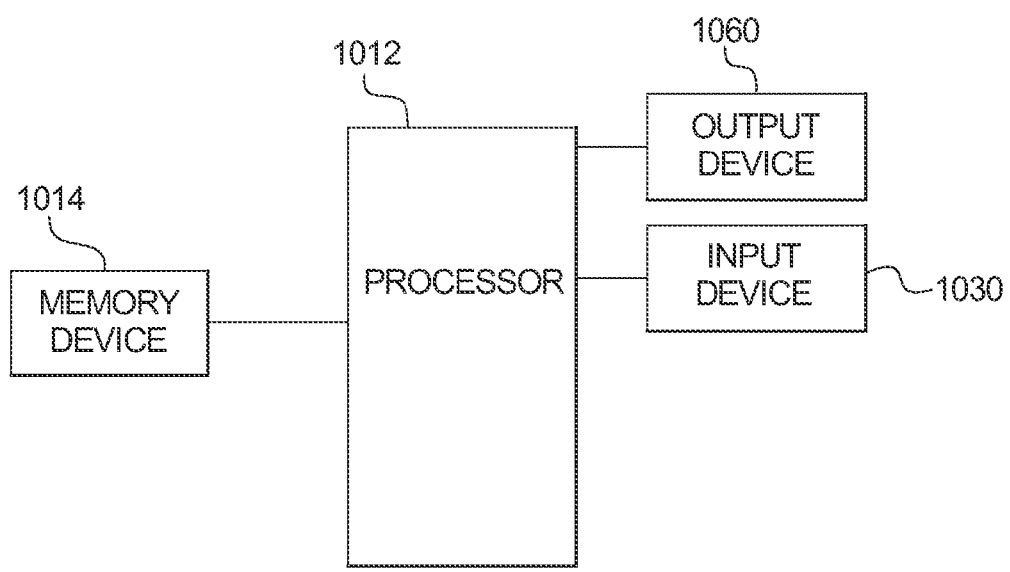
FIG. 6B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 6B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferro-electric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 6B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 7A:
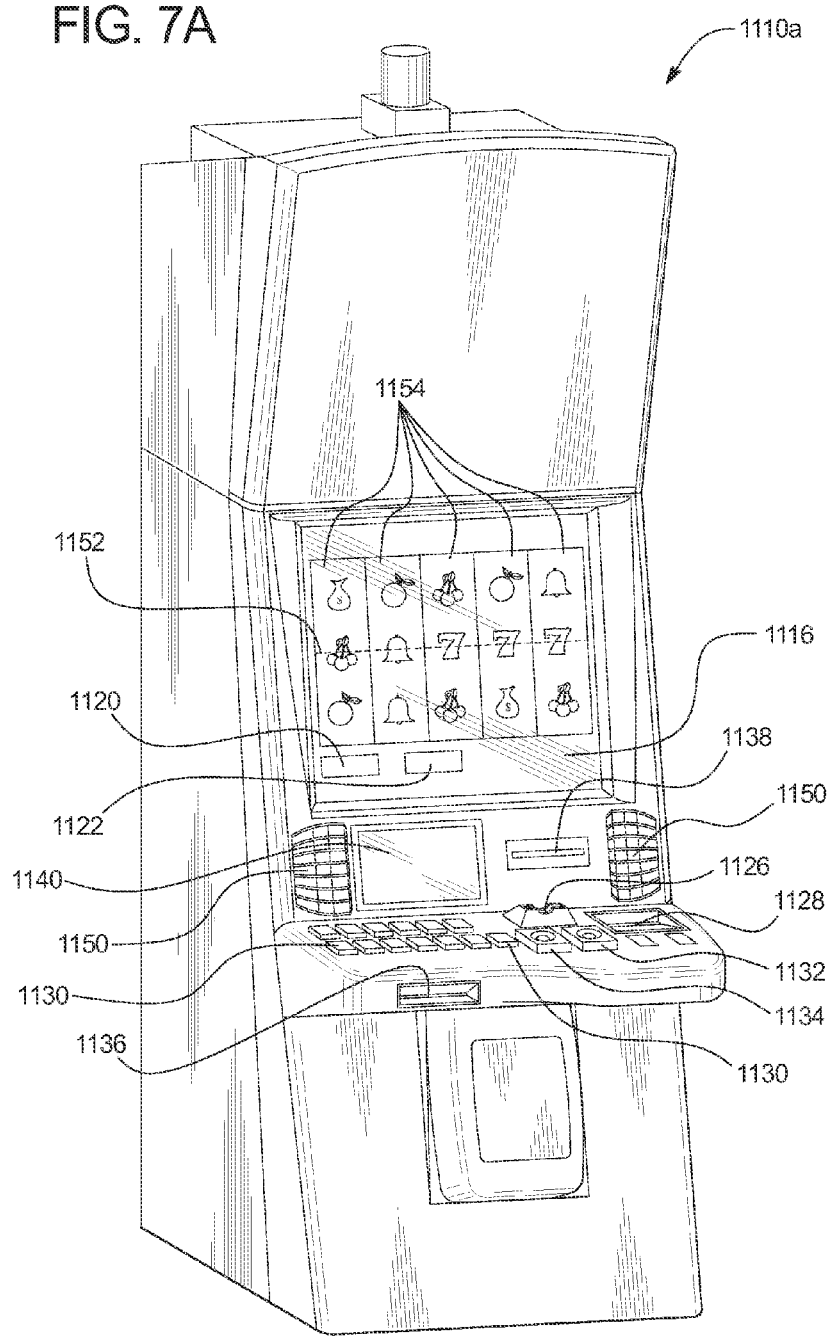
FIGS. 7A and 7B are perspective views of example alternative embodiments of the gaming system disclosed herein.
Figure 7B:
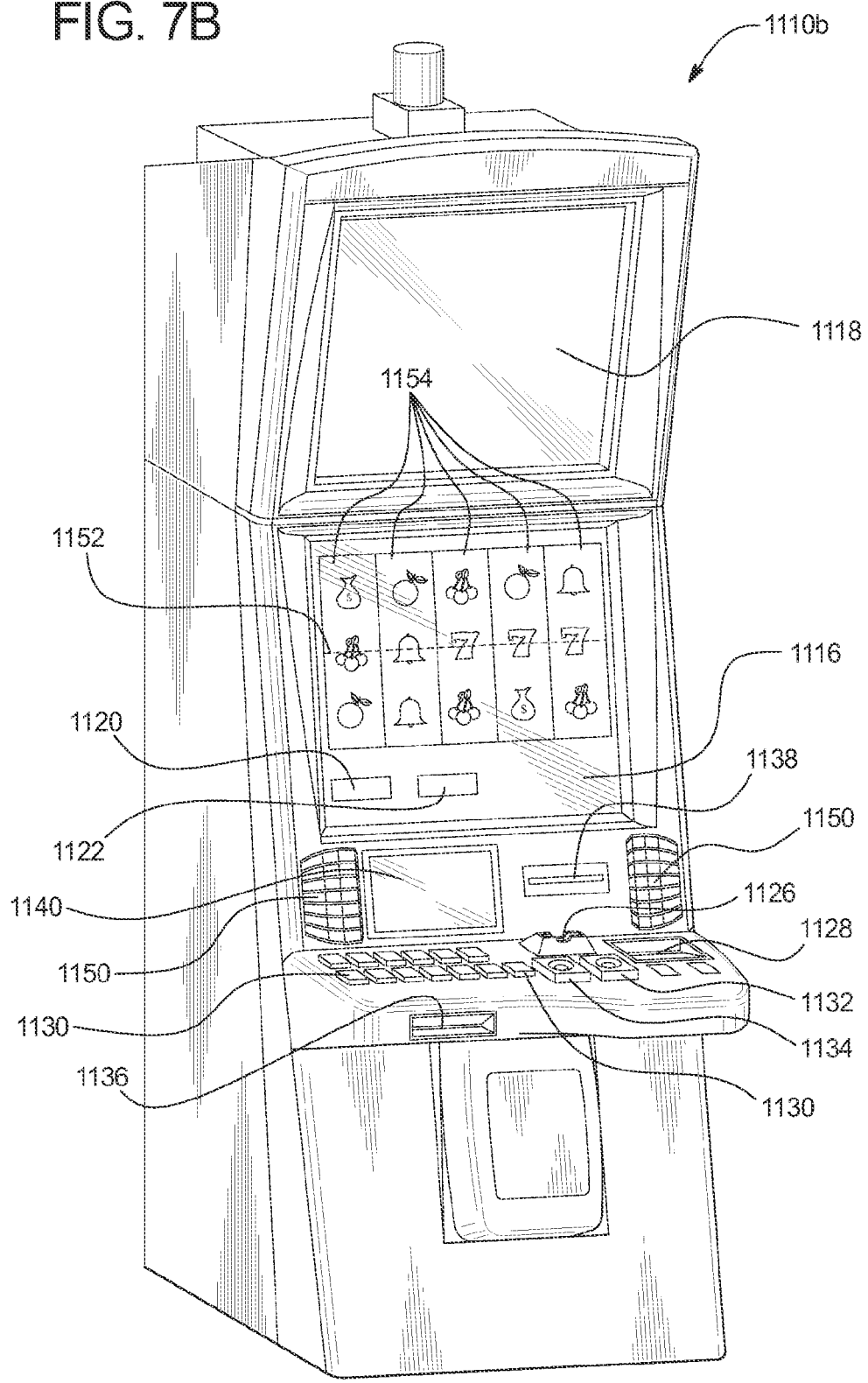

In various embodiments, the EGM includes one or more input devices. The input devices may include any suitable device that enables an input signal to be produced and received by the at least one processor of the EGM. The example EGM illustrated in FIG. 6B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 7A and 7B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 7A and 7B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 7A and 7B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 7A and 7B each include a card reader 1138. The card reader is configured to read a player identification card inserted into the card reader.

In various embodiments, the EGM includes one or more output devices. The example EGM illustrated in FIG. 6B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 7A includes a central display device 1116, a player tracking display 1140, a credit display 1120, and a bet display 1122. The example EGM illustrated in FIG. 7B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 7A and 7B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 7A and 7B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 7A and 7B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 7A and 7B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or
Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 7A and 7B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased: rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:
    a housing;
    at least one display device supported by the housing;
    a plurality of input devices supported by the housing, said plurality of input devices including:
        (i) an acceptor, and
        (ii) a cashout device;
    at least one processor; and
    at least one memory device which stores a plurality of instructions, which when executed by the at least one processor, cause the at least one processor to operate with the at least one display device and the plurality of input devices to:
        (a) responsive to a physical item being received via the acceptor, establish a credit balance based, at least in part, on a monetary value associated with the received physical item, wherein said physical item is selected from the group consisting of: a ticket associated with the monetary value and a unit of currency;
        (b) following a player selection to play a first primary game associated with a non-monetary skill-based secondary game:
            (i) enable the player to place a monetary wager on a play of the first primary game, wherein the credit balance is decreasable based on the placed monetary wager;
            (ii) for the play of the first primary game:
                (A) determine a first primary game outcome,
                (B) display the determined first primary game outcome,
                (C) determine a first monetary award associated with the determined first primary game outcome, and
                (D) display the determined first monetary award, wherein the credit balance is increasable based on the determined first monetary award associated with the determined first primary game outcome;
            (iii) when a skill-based secondary game triggering event occurs:
                (A) determine a skill-based secondary game outcome for a play of the non-monetary skill-based secondary game, the determination based, at least in part, on at least one quantifiable skill input made by the player in association with the play of the non-monetary skill-based secondary game,
                (B) display the determined skill-based secondary game outcome,
                (C) determine a quantity of redeemable non-monetary skill units associated with the determined skill-based secondary game outcome, and
                (D) display the determined quantity of redeemable non-monetary skill units;
        (c) following a player selection to play a second primary game associated with a monetary skill-based secondary game:
            (i) enable the player to place the monetary wager on a play of the second primary game, wherein the credit balance is decreasable based on the placed monetary wager, and an average expected payback percentage of the second primary game associated with the monetary skill-based secondary game is less than an average expected payback percentage of the first primary game associated with the non-monetary skill-based secondary game;
            (ii) for the play of the second primary game:
                (A) determine a second primary game outcome,
                (B) display the determined second primary game outcome,
                (C) determine a second monetary award associated with the determined second primary game outcome, and
                (D) display the determined second monetary award, wherein the credit balance is increasable based on the determined second monetary award associated with the determined second primary game outcome;
            (iii) when the skill-based secondary game triggering event occurs:
                (A) determine a skill-based secondary game outcome for a play of the monetary skill-based secondary game, the determination based, at least in part, on at least one quantifiable skill input made by the player in association with the play of the monetary skill-based secondary game, (B) display the determined skill-based secondary game outcome,
(C) determine a quantity of redeemable non-monetary skill units associated with the determined skill-based secondary game outcome,
(D) display the determined quantity of redeemable non-monetary skill units,
(E) determine a skill-based secondary game monetary award associated with the determined skill-based secondary game outcome, and
(F) display the determined skill-based secondary game monetary award associated with the determined skill-based secondary game outcome; and
(d) responsive to a cashout input being received via the cashout device, cause an initiation of any payout associated with the credit balance.

2. The gaming system of claim 1, wherein, when executed by the at least one processor, the plurality of instructions cause the at least one processor to enable the player to redeem at least one redeemable non-monetary skill unit in exchange for at least one virtual good.

3. The gaming system of claim 2, wherein, when executed by the at least one processor, the plurality of instructions cause the at least one processor to:
display a virtual marketplace including a plurality of virtual goods;
receive a selection of at least one of the plurality of virtual goods;
deduct from an account associated with the player, a designated quantity of redeemable non-monetary skill units associated with the selected at least one of the plurality of virtual goods; and
associate the selected at least one of the plurality of virtual goods with the account associated with the player.

4. The gaming system of claim 1, wherein, when executed by the at least one processor, the plurality of instructions cause the at least one processor to determine, at multiple points during the play of the skill-based secondary game, whether to provide any quantities of redeemable non-monetary skill units to the player.

5. The gaming system of claim 1, wherein the determination of the skill-based secondary game outcome is based on a comparison of the at least one input made by the player in the play of the skill-based secondary game to at least one additional input made by an additional player in a different play of the skill-based secondary game.

6. The gaming system of claim 1, wherein the determined quantity of redeemable non-monetary skill units is based on the monetary wager associated with the play of the primary game.

7. The gaming system of claim 1, wherein the at least one quantifiable skill input is selected from the group consisting of: at least one quantifiable input of a mental skill, and at least one quantifiable input of a physical skill.

8. A method of operating a gaming system, said method comprising:
(a) following a player selection to play a first primary game associated with a non-monetary skill-based secondary game:
(i) enabling a player to place a monetary wager on a play of the first primary game, wherein a credit balance is decreasable based on the placed monetary wager, said credit balance is increasable via an acceptor of a physical item associated with a monetary value, said physical item is selected from the group consisting of: a ticket associated with the monetary value and a unit of currency and the credit balance is decreasable via a cashout device;
(ii) for the play of the first primary game:
(A) causing at least one processor to execute a plurality of instructions to determine a first primary game outcome,
(B) causing at least one display device to display the determined first primary game outcome,
(C) causing the at least one processor to execute a plurality of instructions to determine a first monetary award associated with the determined first primary game outcome, and
(D) causing the at least one display device to display the determined first monetary award, wherein the credit balance is increasable based on the determined first monetary award associated with the determined first primary game outcome; and
(iii) when a skill-based secondary game triggering event occurs:
(A) causing the at least one processor to execute a plurality of instructions to determine a skill-based secondary game outcome for a play of the non-monetary skill-based secondary game, the determination based, at least in part, on at least one quantifiable skill input made by the player in association with the play of the non-monetary skill-based secondary game,
(B) causing the at least one display device to display the determined skill-based secondary game outcome,
(C) causing the at least one processor to execute a plurality of instructions to determine a quantity of redeemable non-monetary skill units associated with the determined skill-based secondary game outcome, and
(D) causing the at least one display device to display the determined quantity of redeemable non-monetary skill units; and
(b) following a player selection to play a second primary game associated with a monetary skill-based secondary game:
(i) enabling the player to place the monetary wager on a play of the second primary game, wherein the credit balance is decreasable based on the placed monetary wager, and an average expected payback percentage of the second primary game associated with the monetary skill-based secondary game is less than an average expected payback percentage of the first primary game associated with the non-monetary skill-based secondary game;
(ii) for the play of the second primary game:
(A) causing the at least one processor to execute a plurality of instructions to determine a second primary game outcome,
(B) causing the at least one display device to display the determined second primary game outcome,
(C) causing the at least one processor to execute a plurality of instructions to determine a second monetary award associated with the determined second primary game outcome, and
(D) causing the at least one display device to display the determined second monetary award, wherein the credit balance is increasable based on the determined second monetary award associated with the determined second primary game outcome;

(iii) when the skill-based secondary game triggering event occurs:
(A) causing the at least one processor to execute a plurality of instructions to determine a skill-based secondary game outcome for a play of the monetary skill-based secondary game, the determination based, at least in part, on at least one quantifiable skill input made by the player in association with the play of the monetary skill-based secondary game,
(B) causing the at least one display device to display the determined skill-based secondary game outcome,
(C) causing the at least one processor to execute a plurality of instructions to determine a quantity of redeemable non-monetary skill units associated with the determined skill-based secondary game outcome,
(D) causing the at least one display device to display the determined quantity of redeemable non-monetary skill units,
(E) causing the at least one processor to execute a plurality of instructions to determine a skill-based secondary game monetary award associated with the determined skill-based secondary game outcome, and
(F) causing the at least one display device to display the determined skill-based secondary game monetary award associated with the determined skill-based secondary game outcome.

9. The method of claim 8, which includes enabling the player to redeem at least one redeemable non-monetary skill unit in exchange for at least one virtual good.

10. The method of claim 9, which includes:
causing the at least one display device to display a virtual marketplace including a plurality of virtual goods;
causing the at least one processor to execute a plurality of instructions to receive a selection of at least one of the plurality of virtual goods;
causing the at least one processor to execute a plurality of instructions to deduct from an account associated with the player, a designated quantity of redeemable non-monetary skill units associated with the selected at least one of the plurality of virtual goods; and
causing the at least one processor to execute a plurality of instructions to associate the selected at least one of the plurality of virtual goods with the account associated with the player.

11. The method of claim 8, which includes causing the at least one processor to execute a plurality of instructions to determine, at multiple points during the play of the skill-based secondary game, whether to provide any quantities of redeemable non-monetary skill units to the player.

12. The method of claim 8, wherein the at least one quantifiable skill input is selected from the group consisting of: at least one quantifiable input of a mental skill, and at least one quantifiable input of a physical skill.

13. The method of claim 8, wherein the determination of the skill-based secondary game outcome is based on a comparison of the at least one input made by the player in the play of the skill-based secondary game to at least one additional input made by an additional player in a different play of the skill-based secondary game.

14. The method of claim 8, wherein the determined quantity of redeemable non-monetary skill units is based on the monetary wager associated with the play of the primary game.

15. A non-transitory computer readable medium including a plurality of instructions, which when executed by at least one processor, cause the at least one processor to:
(a) following a player selection to play a first primary game associated with a non-monetary skill-based secondary game:
(i) enable a player to place a monetary wager on a play of the first primary game, wherein a credit balance is decreasable based on the placed monetary wager, said credit balance is increasable via an acceptor of a physical item associated with a monetary value, said physical item is selected from the group consisting of: a ticket associated with the monetary value and a unit of currency, and said credit balance is decreasable via a cashout device;
(ii) for the play of the first primary game:
(A) determine a first primary game outcome,
(B) cause at least one display device to display the determined first primary game outcome,
(C) determine a first monetary award associated with the determined first primary game outcome, and
(D) cause the at least one display device to display the determined first monetary award, wherein the credit balance is increasable based on the determined first monetary award associated with the determined primary game outcome; and
(iii) when a skill-based secondary game triggering event occurs:
(A) determine a skill-based secondary game outcome for a play of the non-monetary skill-based secondary game, the determination based, at least in part, on at least one quantifiable skill input made by the player in association with the play of the non-monetary skill-based secondary game,
(B) cause the at least one display device to display the determined skill-based secondary game outcome,
(C) determine a quantity of redeemable non-monetary skill units associated with the determined skill-based secondary game outcome, and
(D) cause the at least one display device to display the determined quantity of redeemable non-monetary skill units; and
(b) following a player selection to play a second primary game associated with a monetary skill-based secondary game:
(i) enable the player to place the monetary wager on a play of the second primary game, wherein the credit balance is decreasable based on the placed monetary wager, and an average expected payback percentage of the second primary game associated with the monetary skill-based secondary game is less than an average expected payback percentage of the first primary game associated with the non-monetary skill-based secondary game;
(ii) for the play of the second primary game:
(A) determine a second primary game outcome,
(B) cause the at least one display device to display the determined second primary game outcome,
(C) determine a second monetary award associated with the determined second primary game outcome, and
(D) cause the at least one display device to display the determined second monetary award, wherein the credit balance is increasable based on the determined second monetary award associated with the determined second primary game outcome;
(iii) when the skill-based secondary game triggering event occurs:
 (A) determine a skill-based secondary game outcome for a play of the monetary skill-based secondary game, the determination based, at least in part, on at least one quantifiable skill input made by the player in association with the play of the monetary skill-based secondary game,
 (B) cause the at least one display device to display the determined skill-based secondary game outcome,
 (C) determine a quantity of redeemable non-monetary skill units associated with the determined skill-based secondary game outcome,
 (D) cause the at least one display device to display the determined quantity of redeemable non-monetary skill units,
 (E) determine a skill-based secondary game monetary award associated with the determined skill-based secondary game outcome, and
(F) cause the at least one display device to display the determined skill-based secondary game monetary award associated with the determined skill-based secondary game outcome.

16. The non-transitory computer readable medium of claim 15, wherein when executed by the at least one processor, the plurality of instructions cause the at least one processor to enable the player to redeem at least one redeemable non-monetary skill unit in exchange for at least one virtual good.

17. The non-transitory computer readable medium of claim 16, wherein when executed by the at least one processor, the plurality of instructions cause the at least one processor to:

cause the at least one display device to display a virtual marketplace including a plurality of virtual goods;
receive a selection of at least one of the plurality of virtual goods;
deduct from an account associated with the player, a designated quantity of redeemable non-monetary skill units associated with the selected at least one of the plurality of virtual goods; and
associate the selected at least one of the plurality of virtual goods with the account associated with the player.

18. The non-transitory computer readable medium of claim 15, wherein when executed by the at least one processor, the plurality of instructions cause the at least one processor to determine, at multiple points during the play of the skill-based secondary game, whether to provide any quantities of redeemable non-monetary skill units to the player.

19. The non-transitory computer readable medium of claim 15, wherein the at least one quantifiable skill input is selected from the group consisting of: at least one quantifiable input of a mental skill, and at least one quantifiable input of a physical skill.

20. The non-transitory computer readable medium of claim 15, wherein the determination of the skill-based secondary game outcome is based on a comparison of the at least one input made by the player in the play of the skill-based secondary game to at least one additional input made by an additional player in a different play of the skill-based secondary game.

21. The non-transitory computer readable medium of claim 15, wherein the determined quantity of redeemable non-monetary skill units is based on the monetary wager associated with the play of the primary game.

* * * * *